(12) United States Patent
Mustafa (10) Patent No.: US 11,242,222 B2
(45) Date of Patent: Feb. 8, 2022

(54) ELEVATOR BRAKING DEVICE MECHANISM

(71) Applicant: OTIS ELEVATOR COMPANY, Farmington, CT (US)

(72) Inventor: Tanjil Mustafa, New Britain, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 373 days.

(21) Appl. No.: 16/172,140

(22) Filed: Oct. 26, 2018

(65) Prior Publication Data
US 2020/0131000 A1    Apr. 30, 2020

(51) Int. Cl.
*B66B 5/22* (2006.01)
*F16M 13/02* (2006.01)

(52) U.S. Cl.
CPC ............... *B66B 5/22* (2013.01); *F16M 13/02* (2013.01)

(58) Field of Classification Search
CPC .................................. B66B 5/22; F16M 13/02
See application file for complete search history.

(56) References Cited

U.S. PATENT DOCUMENTS

| | | | | |
|---|---|---|---|---|
| 7,591,351 B2 * | 9/2009 | Fischer | ...................... | B66B 5/18 188/161 |
| 9,643,815 B2 * | 5/2017 | Wei | ........................... | B66B 5/00 |
| 9,663,327 B2 * | 5/2017 | Terry | ........................ | B66B 5/20 |
| 9,919,898 B2 * | 3/2018 | Osmanbasic | ............. | B66B 5/20 |
| 9,981,827 B2 * | 5/2018 | Osmanbasic | ........... | F16D 59/00 |
| 2003/0085085 A1 * | 5/2003 | Simmonds | ................ | B66B 5/22 188/189 |
| 2017/0001835 A1 * | 1/2017 | Hu | .......................... | F16D 65/16 |
| 2017/0066628 A1 * | 3/2017 | Zhang | ........................ | B66B 5/22 |
| 2017/0261054 A1 * | 9/2017 | Drews | ..................... | F16D 65/22 |
| 2018/0118519 A1 * | 5/2018 | Fonteneau | .......... | B66B 11/0206 |
| 2018/0162693 A1 * | 6/2018 | Hu | .......................... | B66B 7/048 |
| 2018/0162694 A1 * | 6/2018 | Hu | .............................. | B66B 5/04 |
| 2018/0237263 A1 * | 8/2018 | Fargo | ........................ | B66B 5/16 |
| 2018/0251339 A1 * | 9/2018 | Duvall | ..................... | B66B 7/022 |
| 2018/0282124 A1 * | 10/2018 | Watson | ..................... | B66B 9/00 |
| 2018/0327224 A1 * | 11/2018 | Billard | ....................... | B66B 5/22 |
| 2019/0062113 A1 * | 2/2019 | Hu | ............................ | B66B 5/18 |
| 2019/0330020 A1 * | 10/2019 | Sanchez Munoz | ....... | B66B 5/22 |

(Continued)

FOREIGN PATENT DOCUMENTS

| CN | 1047360 C | 12/1999 |
|---|---|---|
| CN | 101003352 A | 7/2007 |

(Continued)

OTHER PUBLICATIONS

FR9390 Machine translation (Year: 1908).*

(Continued)

*Primary Examiner* — Michael A Riegelman
(74) *Attorney, Agent, or Firm* — Cantor Colburn LLP (57) ABSTRACT

A support member of a braking device includes a body configured to couple to the braking device. The body has a first portion including a first inclined body surface and a second inclined body surface. The first portion is receivable within an opening having a first inclined opening surface and second inclined opening surface. The first inclined body surface is complementary to the first inclined opening surface and the first portion of the body is movable within the opening.

16 Claims, 8 Drawing Sheets

(56) References Cited

U.S. PATENT DOCUMENTS

| | | | |
|---|---|---|---|
| 2020/0048042 A1* | 2/2020 | Sanchez Munoz | B66B 5/18 |
| 2020/0131000 A1* | 4/2020 | Mustafa | B66B 5/18 |
| 2020/0270098 A1* | 8/2020 | Mustafa | B66B 5/22 |
| 2020/0354192 A1* | 11/2020 | Sotoca | B66B 5/18 |

FOREIGN PATENT DOCUMENTS

| | | |
|---|---|---|
| CN | 101072723 A | 11/2007 |
| CN | 101200259 A | 6/2008 |
| CN | 201494982 U | 6/2010 |
| CN | 101575062 B | 5/2011 |
| CN | 102887411 B | 1/2013 |
| CN | 203497872 U | 3/2014 |
| CN | 205023646 U | 2/2016 |
| CN | 105722781 A | 6/2016 |
| CN | 105905739 A | 8/2016 |
| FR | 9390 E | 10/1908 |
| WO | 2007102211 A1 | 9/2007 |
| WO | 2016162716 A1 | 10/2016 |
| WO | 2017037777 A1 | 3/2017 |
| WO | 2017087976 A1 | 5/2017 |

OTHER PUBLICATIONS

Chinese Office Action; International Application No. 201911022313.6; International Filing Date: Oct. 25, 2019; dated Oct. 26, 2020; 10 pages.

Extended European Search Report; International Application No. 19204810.6-1017; International Filing Date: Oct. 23, 2019; dated Jul. 20, 2020; 40 pages.

Second Office Action; Chinese Application No. 201911022313.6; International Filing Date: Oct. 25, 2019; dated Apr. 22, 2021; 11 pages, no translation available.

\* cited by examiner

ELEVATOR BRAKING DEVICE MECHANISM

BACKGROUND

Embodiments of this disclosure relate generally to an elevator system, and more particularly to an elevator braking device that is movable independently from the elevator car.

Elevator systems includes variety of devices operable to control the speed and motion of the elevator car. A motor, commonly referred to as a machine, causes desired movement of the elevator car to move passengers between a plurality of landings. A brake associated with the motor prevents movement of the elevator car when the elevator car is stopped at a landing. The brake is used to limit the movement and speed of the elevator car under most conditions.

Elevator systems additionally include auxiliary brakes, sometimes referred to as "safeties" designed to stop movement of the elevator car if the elevator car is travelling at a speed greater than a desired speed. A subset of safeties, referred to as asymmetric safeties, are typically affixed to an upright of the elevator car and include a stationary braking shoe and a movable braking shoe disposed on opposite sides of a guide rail of the elevator. To operate the braking device, the movable braking shoe is typically moved both laterally and vertically towards the rail and the stationary shoe to frictionally engage and clamp the blade of the guide rail between the stationary and movable braking shoes. As the movable brake shoe contacts the rail and moves towards the stationary shoe, it pushes the braking device laterally, thereby eliminating the running clearance between the rail and the stationary shoe. Because the braking device is fixed to the elevator car, this lateral movement of the braking device, and therefore the elevator car, results in compression of the roller guides which guide movement of the elevator car along a surface of the guide rail. As a result, the requirements of the roller guides are constricted by operation of the safeties.

BRIEF DESCRIPTION

According to an embodiment, a support member of a braking device includes a body configured to couple to the braking device. The body has a first portion including a first inclined body surface and a second inclined body surface. The first portion is receivable within an opening having a first inclined opening surface and second inclined opening surface. The first inclined body surface is complementary to the first inclined opening surface and the first portion of the body is movable within the opening.

In addition to one or more of the features described above, or as an alternative, in further embodiments the first portion is generally parallelogram-like in shape.

In addition to one or more of the features described above, or as an alternative, in further embodiments the second inclined surface of the support member is parallel to the first inclined surface of the support member.

In addition to one or more of the features described above, or as an alternative, in further embodiments the body further comprises a second portion, the first portion and the second portion being integrally formed.

In addition to one or more of the features described above, or as an alternative, in further embodiments a configuration of first portion is different than a configuration of the second portion.

In addition to one or more of the features described above, or as an alternative, in further embodiments the second portion has a quadrilateral shape.

In addition to one or more of the features described above, or as an alternative, in further embodiments at least one dimension of the second portion is greater than the opening.

According to another embodiment, an elevator system includes an elevator car movable within a hoistway and a braking device. A support member is affixed to the braking device for associating the braking device with the elevator car. The support member and the braking device are movable independently of the elevator car.

In addition to one or more of the features described above, or as an alternative, in further embodiments the elevator car includes a car upright having an opening formed therein and the support member further comprises a first portion received within the opening.

In addition to one or more of the features described above, or as an alternative, in further embodiments the first portion of the support member includes a first inclined body surface and a second inclined body surface and the opening includes a first inclined opening surface and a second inclined opening surface, the first inclined body surface being complementary to the first inclined opening surface and the second inclined body surface being complementary to the second inclined opening surface.

In addition to one or more of the features described above, or as an alternative, in further embodiments the opening is larger than the first portion of the support member such that the support member is movable within the opening.

In addition to one or more of the features described above, or as an alternative, in further embodiments the support member further comprises a second portion, wherein a configuration of the second portion is different than a configuration of the first portion.

In addition to one or more of the features described above, or as an alternative, in further embodiments the first portion and the second portion are integrally formed.

In addition to one or more of the features described above, or as an alternative, in further embodiments the first portion is generally rhombus-like in shape.

In addition to one or more of the features described above, or as an alternative, in further embodiments the second portion is generally rectangular in shape.

In addition to one or more of the features described above, or as an alternative, in further embodiments at least one dimension of the second portion is larger than the opening.

According to yet another embodiment, a method of resetting a braking device includes moving an elevator car upward, sliding a support member coupled to the braking device relative to the elevator car, and moving a brake wedge of the braking device along a sloped slide path.

In addition to one or more of the features described above, or as an alternative, in further embodiments sliding the support member relative to the elevator car occurs via a biasing force of a return assembly acting on the braking device.

In addition to one or more of the features described above, or as an alternative, in further embodiments the brake wedge of the braking device moves along the sloped slide path via gravity.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
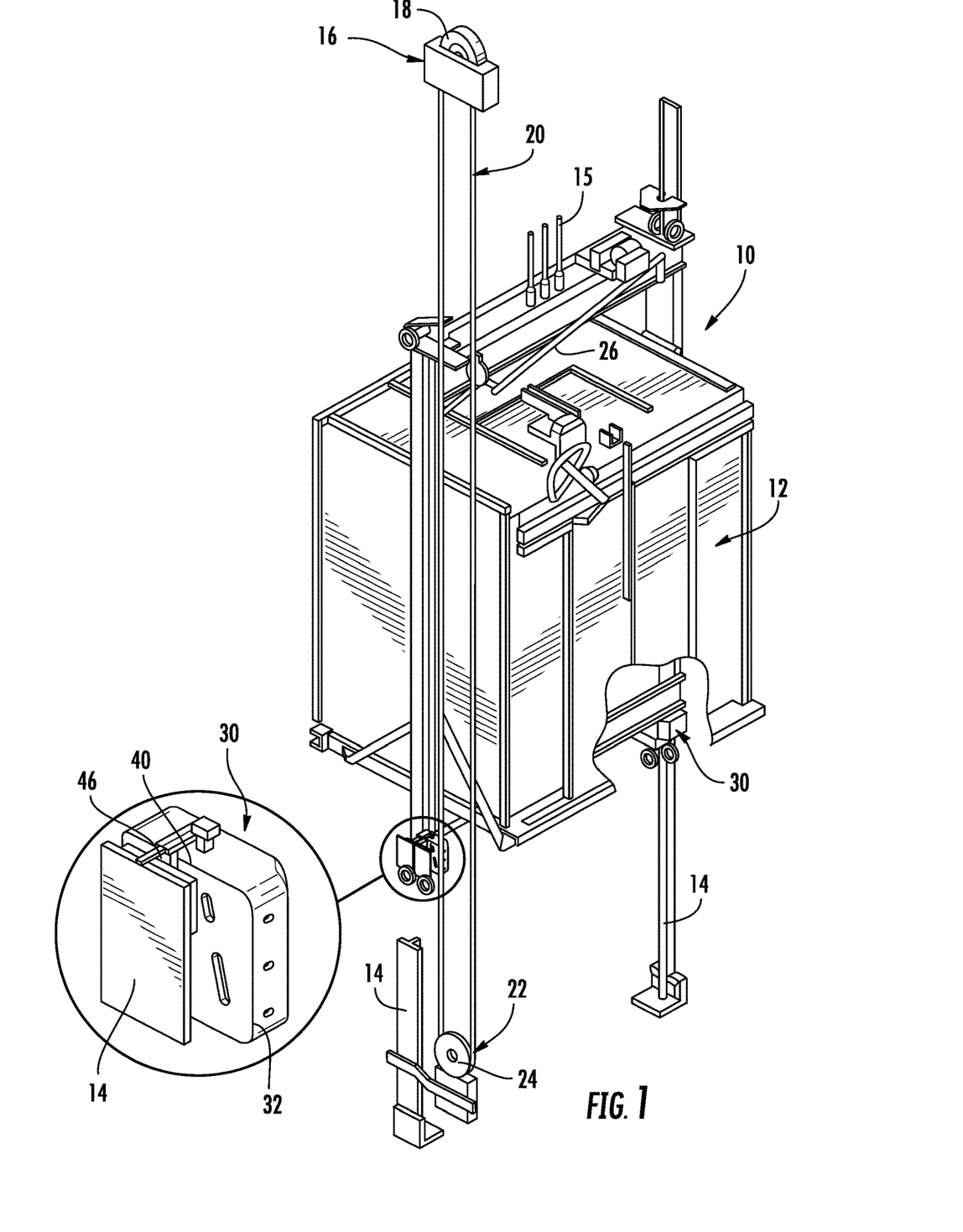
FIG. 1 is a schematic view of a portion of an example of an elevator system.

Referring now to FIG. 1, an elevator system 10 including an elevator car 12, guide rails 14, and a governor assembly 16 is illustrated. The governor assembly 16 includes a governor sheave 18, a rope loop 20, and a rope tensioning assembly 22 including a tensioning sheave 24. The elevator car 12 travels on or is slidably connected to the guide rails 14 and travels within a hoistway (not shown) via one or more tensioning members 15 driven by a machine (not shown). The governor sheave 18 is mounted, in the illustrated, non-limiting embodiment, at an upper end of the hoistway. The rope loop 20 is wrapped partially around the governor sheave 18 and partially around the tensioning sheave 24 (located in this embodiment at a bottom end of the hoistway). The rope loop 20 is also connected to the elevator car 12, thereby ensuring that the angular velocity of the governor sheave 18 is related to the speed of the elevator car 12.

In the elevator system shown in FIG. 1, the governor assembly 16 acts to prevent the elevator car 12 from exceeding a set speed as it travels inside the hoistway. Although the governor assembly 16 shown in FIG. 1 is mounted at an upper end of the hoistway, the location and arrangement of the governor assembly 16 may vary across different embodiments of the present disclosure. For example, the governor assembly 16 may be mounted at any point along the rope loop 20 in the hoistway, including at the bottom, i.e. the pit, of the hoistway. In another embodiment, the governor assembly 16 may alternatively, be mounted to and move with the elevator car 12. Such an alternative embodiment involves a static rope anchored at the top and tensioned by a weight or an elastic member at the bottom of the hoistway and wrapped partially around the tripping sheave 18 and an adjacent idler sheave.

The illustrated governor assembly 16 operates in a known manner. In the event that the elevator car 12 moves too quickly, a tripping mechanism (not shown) exerts a braking force on the governor sheave 18, which causes the rope loop 20 to apply a force to a mechanical linkage 26 to activate at least one braking device 30, sometimes referred to as a "safety", supported by the elevator car 12. As will be described in more detail below, the braking device 30 is operable to apply a braking force to the guide rail 14 to prevent further movement of the elevator car 12.

Figure 2:
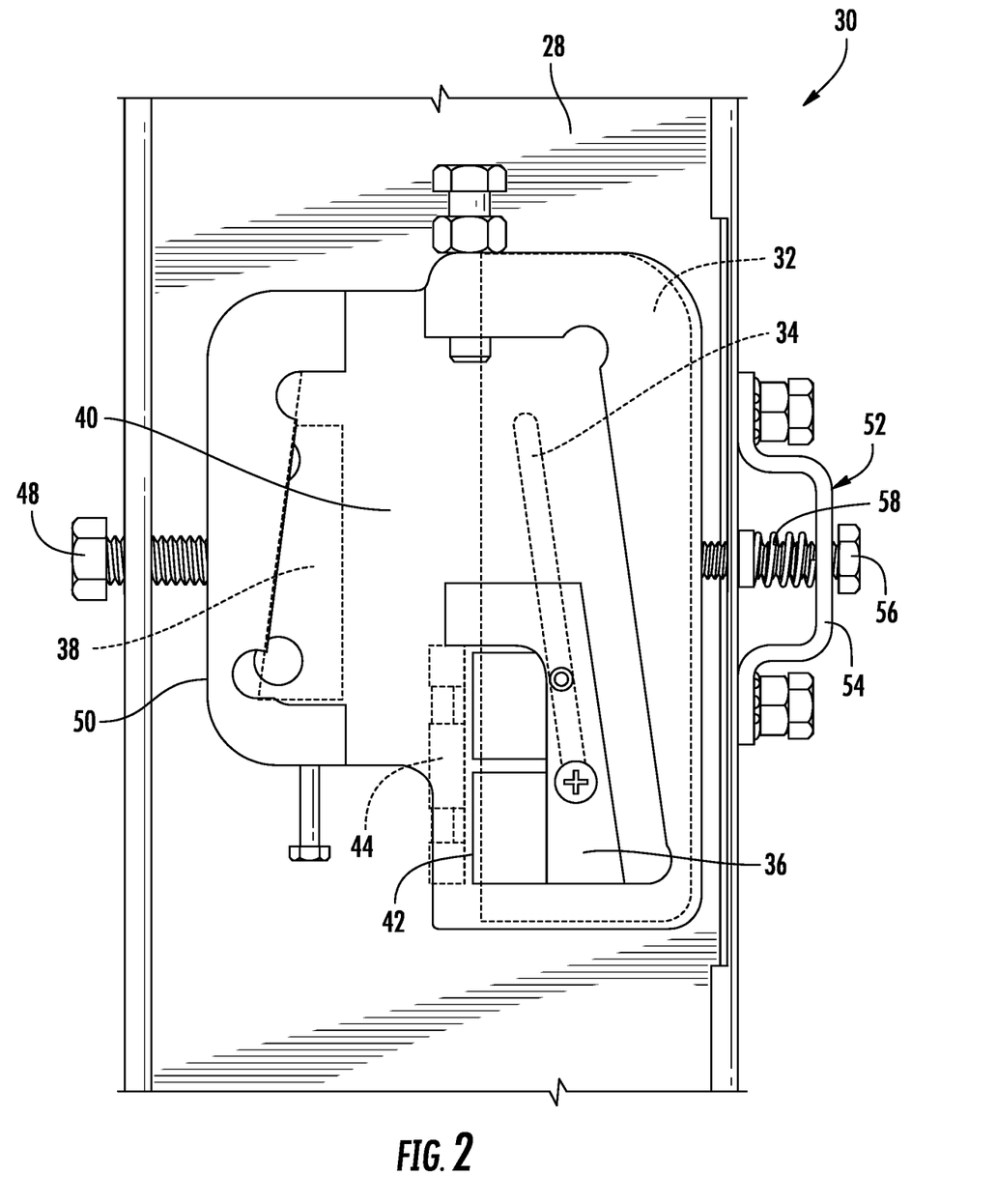
FIG. 2 is a front view of an example of a braking device according to an embodiment.
Figure 3A:
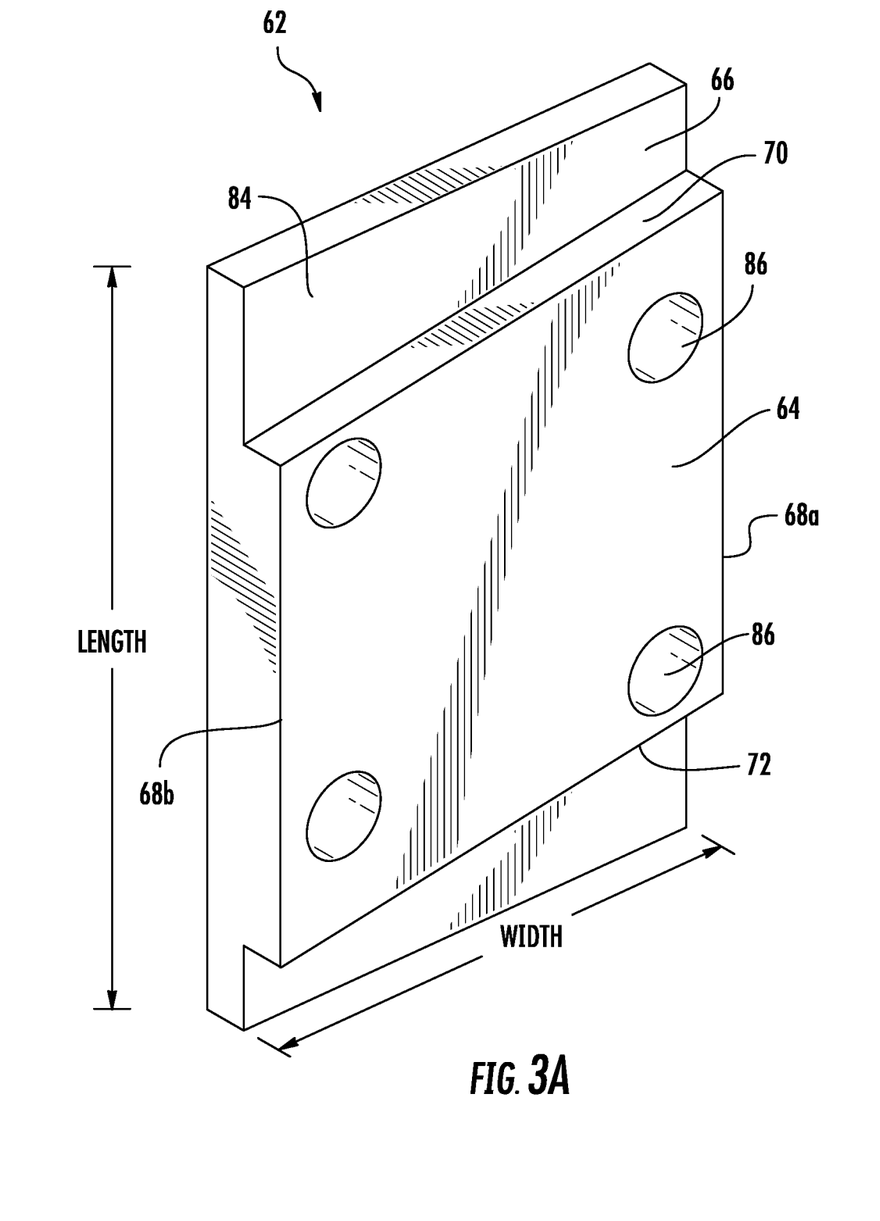
FIG. 3A is a perspective view of a support member for mounting the braking device to a car upright according to an embodiment.
Figure 3B:
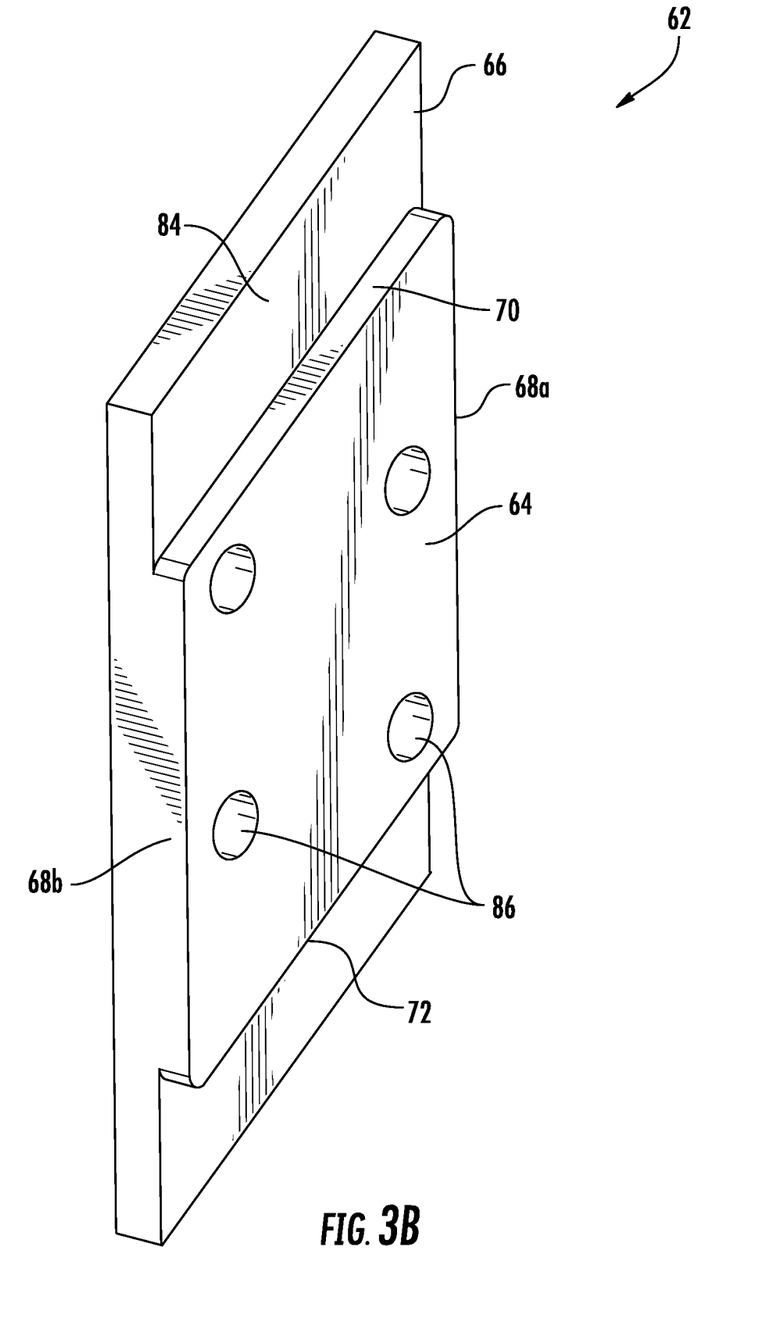
FIG. 3B is a perspective view of another support member for mounting the braking device to a car upright according to an embodiment.

Referring now to FIG. 2, a front view of an example of a braking device 30 mounted to an upright 28 of the elevator car 12 is illustrated in more detail. As shown, the braking device 30 includes a body or housing 32 defining a sloped slide path 34. A brake wedge 36 is movably coupled to the body 32 via the sloped slide path 34, and a stationary block 38 is mounted to the body 32. As shown, the stationary block 38 is spaced from the brake wedge 36 such that a passage 40 is defined there between.

In the illustrated, non-limiting embodiment, the brake wedge 36 includes at least one biasing mechanism 42, such as a spring for example, and a brake pad 44 mounted to the biasing mechanism 42 and facing the passage 40. Although two biasing mechanisms 42 are shown in the illustrated embodiment, it should be understood that embodiments having any number of biasing mechanisms 42, such as a single biasing mechanism, or more than two biasing mechanisms are also within the scope of the disclosure.

As the elevator car 12 ascends and descends, the braking device 30 travels along the guide rail 14 such that a blade 46 of the guide rail 14 is positioned within the passage 40 (see FIG. 1). Upon detection of a predetermined condition, such as power loss, run away, free fall, or another emergency, a force is applied to the mechanical linkage 26 coupled to the brake wedge 36. As a result, the brake wedge 36 will slide within the sloped slide path 34, thereby reducing the size of the passage 40 between the brake wedge 36 and the stationary block 38 until the blade 46 of the guide rail 14 is frictionally clamped between the brake wedge 36 and the stationary block 38. As the brake wedge 36 moves, the braking pad 44 will contact a surface (not shown) of the blade 46 of the guide rail 14 and compress the biasing mechanism 42, thereby providing a smooth transition between free motion and braking. The friction between both the stationary block 38 and the braking pad 44 and the guide rail 14 reduces the speed of the elevator car 12 and will eventually bring the elevator car 12 to a stop.

A fastener 48, such as a bolt for example, is connected to a first side 50 of the body 32. The fastener 48 is operable to adjust the position of the passage 40 relative to the guide rail 14 during normal operation of the elevator. A return assembly 52 including a bracket 54, fastener 56, and a biasing mechanism 58 is mounted adjacent a second, opposite side 60 of the body 32.

In embodiments where the braking device 30 is rigidly mounted to the upright 28 of the elevator car 12, as the brake wedge 36 moves along the sloped slide path 34, the brake wedge 36 pushes the housing 32 of the braking device 30 laterally, thereby eliminating the running clearance or passage 40 between the rail 14 and the stationary block 38. When the braking device 30 is rigidly fixed to the elevator car 12, this lateral movement of the braking device 30, causes a corresponding lateral movement of the elevator car 12. It should be understood that the braking device 30 illustrated and described herein is intended as an example only, and that a braking device 30 having another configuration, such as two movable braking wedges for example, are also within the scope of the disclosure.

To prevent movement of the elevator car 12 in response to operation of the braking device 30, the braking device 30 is movably mounted to a portion of the elevator car 12. With reference now to FIGS. 3-7, various views of the interface between the braking device 30 and a portion of the elevator car 12, such as the car upright 28 for example, are illustrated. As shown, the body 32 of the braking device 30 is affixed to the car upright 28 via a support member 62. However, it should be understood that the braking device 30 may be affixed to any suitable portion of the elevator car 12. In the illustrated, non-limiting embodiment, the support member 62 has a stepped configuration including an integrally formed front portion 64 and back portion 66. The front portion 64 includes a pair of parallel sides 68a, 68b. An upper surface 70 extends between a first end of the pair of parallel sides 68a, 68b and a lower surface 72 extends between a second, opposite end of the pair of parallel sides 68a, 68b. In the illustrated, non-limiting embodiment, the upper surface 70 and the lower surface 72 are generally parallel to one another and are arranged at a non-perpendicular angle to the first pair of sides 68a, 68b. As a result, the front portion 64 of the support member 62 is parallelogram-like in shape. However, embodiments where the upper surface 70 and the lower surface 72 are not parallel are also within the scope of the disclosure. Further, the cross-section of the front portion 64 may be substantially uniform over the thickness of the front portion 64. In an embodiment, the thickness of the front portion 64 is substantially equal to or greater than the thickness of a car upright 28 or another component to which the support member 62 is mounted.

As shown, the back portion 66 of the support member 62 has a quadrilateral shape and is substantially uniform over its thickness. In an embodiment, best shown in FIG. 3A, the back portion 66 is generally rectangular. In another embodiment, the shape of the back portion 66 is similar to the shape of the front portion 64 (see FIG. 3B). However, it should be understood that a back portion 66 having any suitable shape is within the scope of the disclosure. One or more dimensions of the back portion 66 of the support member 62 may be greater than the corresponding dimensions of the front portion 64 of the support member 62. For example, a length of the back portion 66 is typically larger than the length of the front portion 64. In the illustrated, non-limiting embodiment, the widths of the front portion 64 and the back portion 66 are the same. However, embodiments where the width of the back portion 66 is greater than the width of the front portion 64 are also within the scope of the disclosure. Further, one or more protrusions or cutouts may be formed in either the front portion 64 of the back portion 66 of the support member 62.

Figure 4:
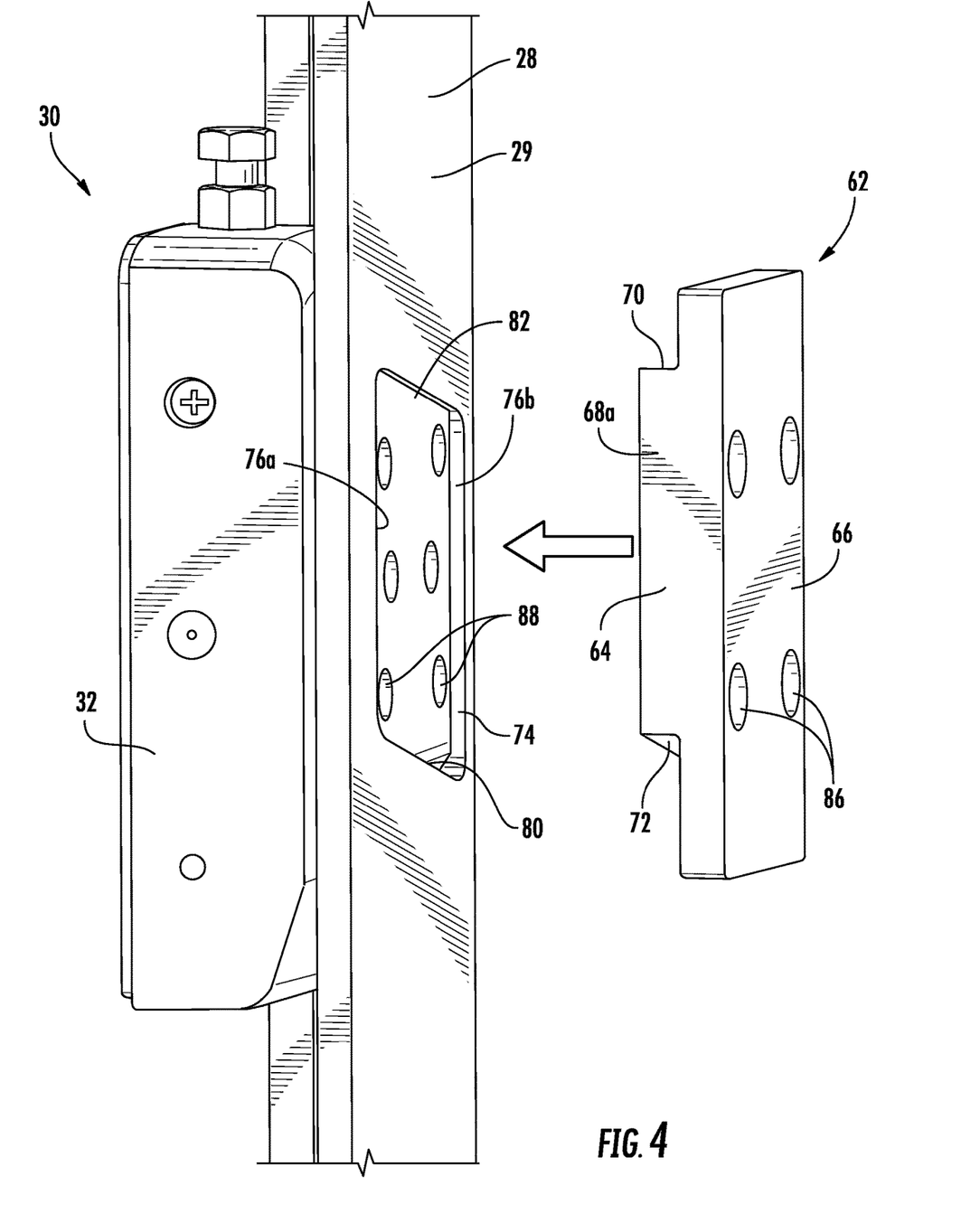
FIG. 4 is another perspective view of a support member for mounting the braking device to a car upright according to an embodiment.
Figure 5:
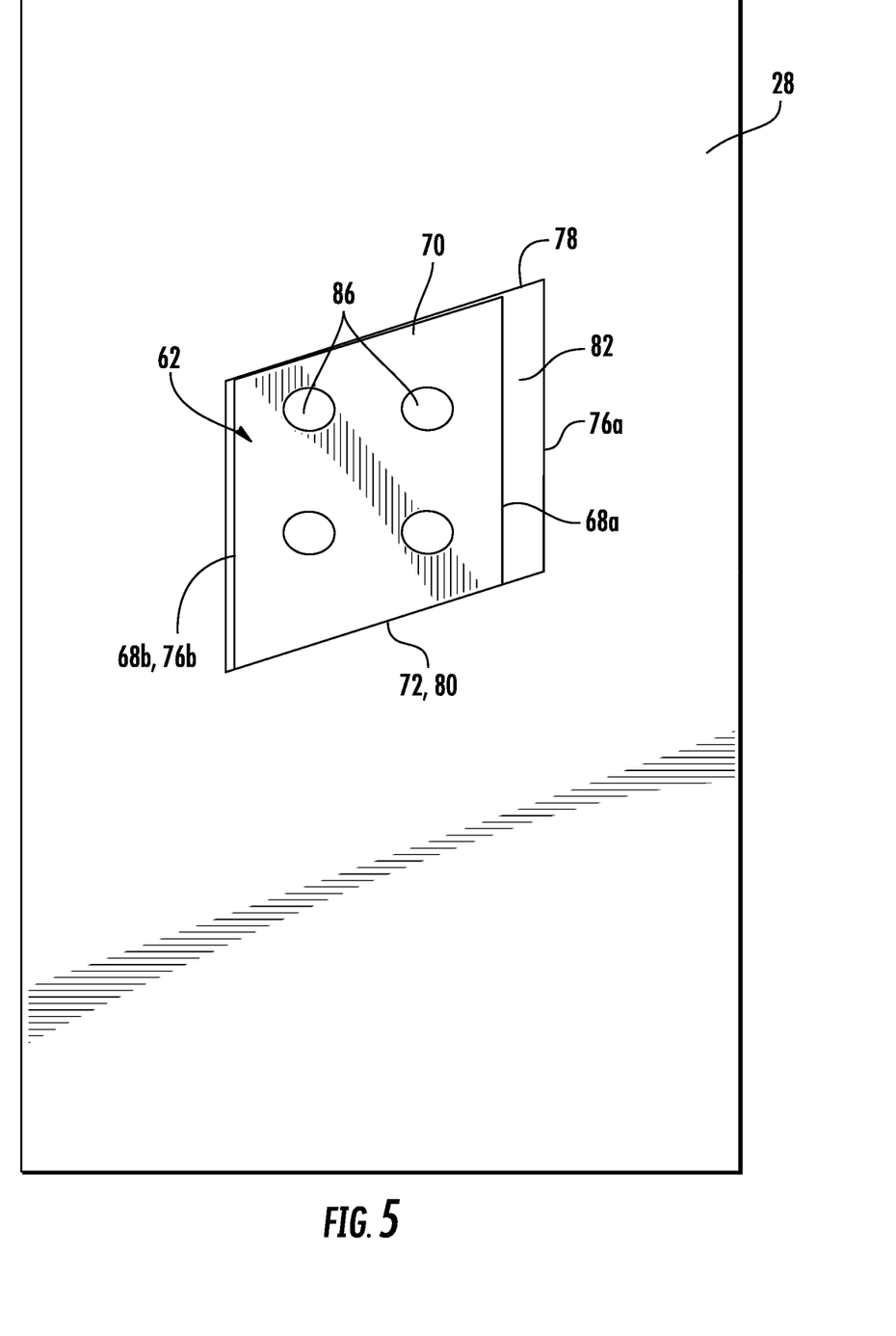
FIG. 5 is a front view of a support member for mounting the braking device to a car upright according to an embodiment
Figure 6:
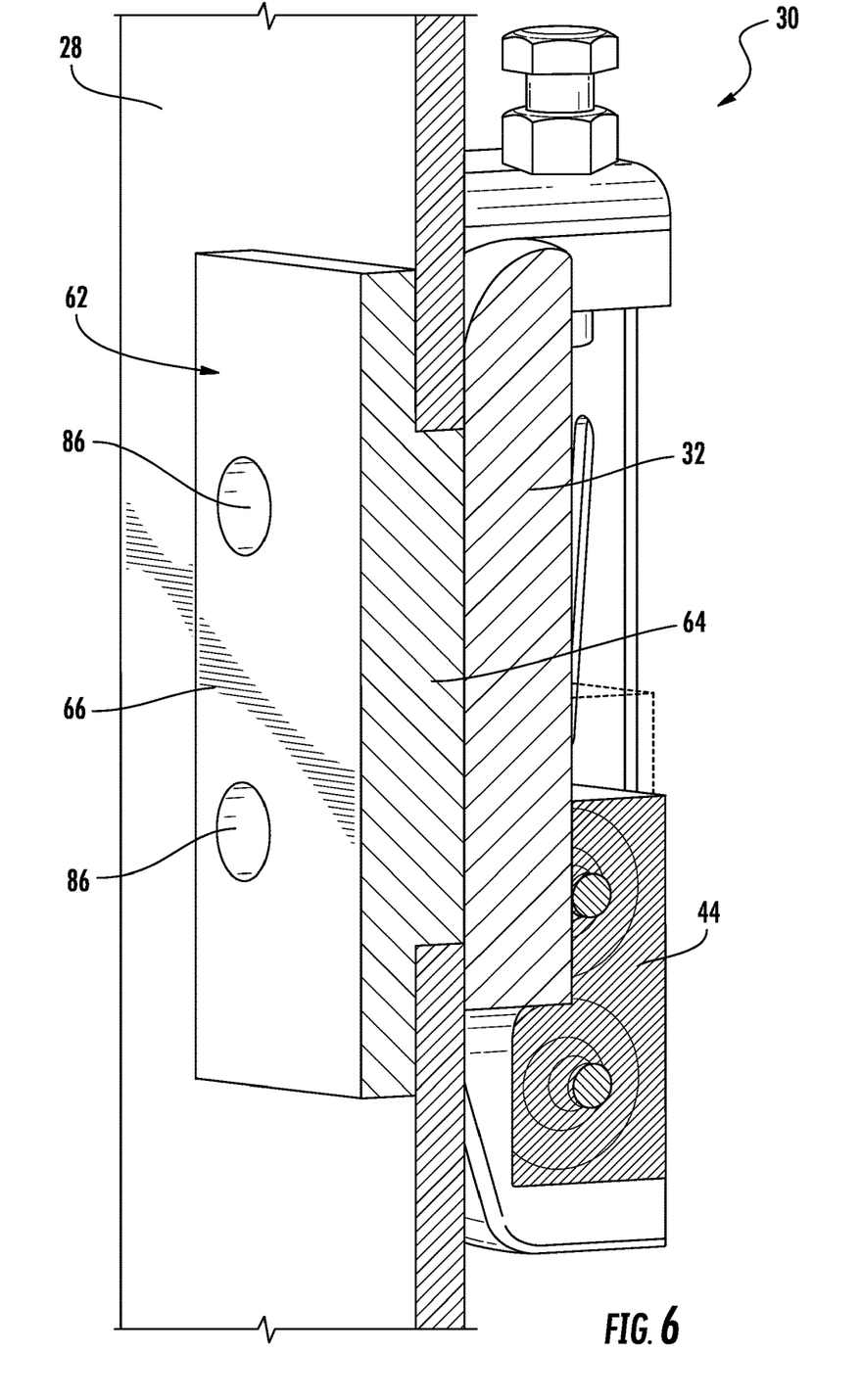
FIG. 6 is a cross-sectional view of the support member connected to the braking device according to an embodiment.

With reference to FIGS. 4-6, the car upright 28 includes an opening 74 having a shape generally complementary to the shape of the front portion 64. In the illustrated, non-limiting embodiment, the opening 74 includes a first pair of parallel sides 76a, 76b, an upper surface 78 extending between a first end of the pair of parallel sides 76a, 76b and a lower surface 80 extending between a second, opposite end of the pair of parallel sides 76a, 76b. In an embodiment, the incline of the upper surface 78 is generally equal to the incline of the upper surface 70 of the support member 62 and the incline of the lower surface 80 is generally equal to the incline of the lower surface 72 of the support member 62.

However, one or more dimensions of the openings 74 formed in the car upright 28 are greater than a corresponding dimension of the support member 62. In an embodiment, the width of the opening 74 is greater than a width of the front portion 64 of the support member 62. As a result, a clearance 82 is formed between at least one side of the front portion 64 of the support member 62 and a corresponding side of the opening 74. With this clearance 82, the support member 62 is movable within the opening 74 during operation of the braking device 30, as the housing 32 of the braking device 30 is pushed laterally. In an embodiment, the clearance is at least equal to the lateral sliding distance of the housing 32, or to the width of the passage 40 for example.

Further, a small clearance or gap may exist between at least one of the upper surfaces 70, 78 and the lower surfaces 72, 80 to prevent the support member 62 from binding within the opening 74. In an embodiment, this clearance is between about 0.6 mm and about 1.5 mm. In addition, the thickness of the front portion 64 is greater than the thickness of the upright 28 such that a front face 84 of the back portion 66 is offset from the surface of the upright 28. In an embodiment, the gap between the front face 84 of the back portion 66 and the surface 29 of the upright is between about 0.2 mm and about 0.4 mm.

Figure 7:
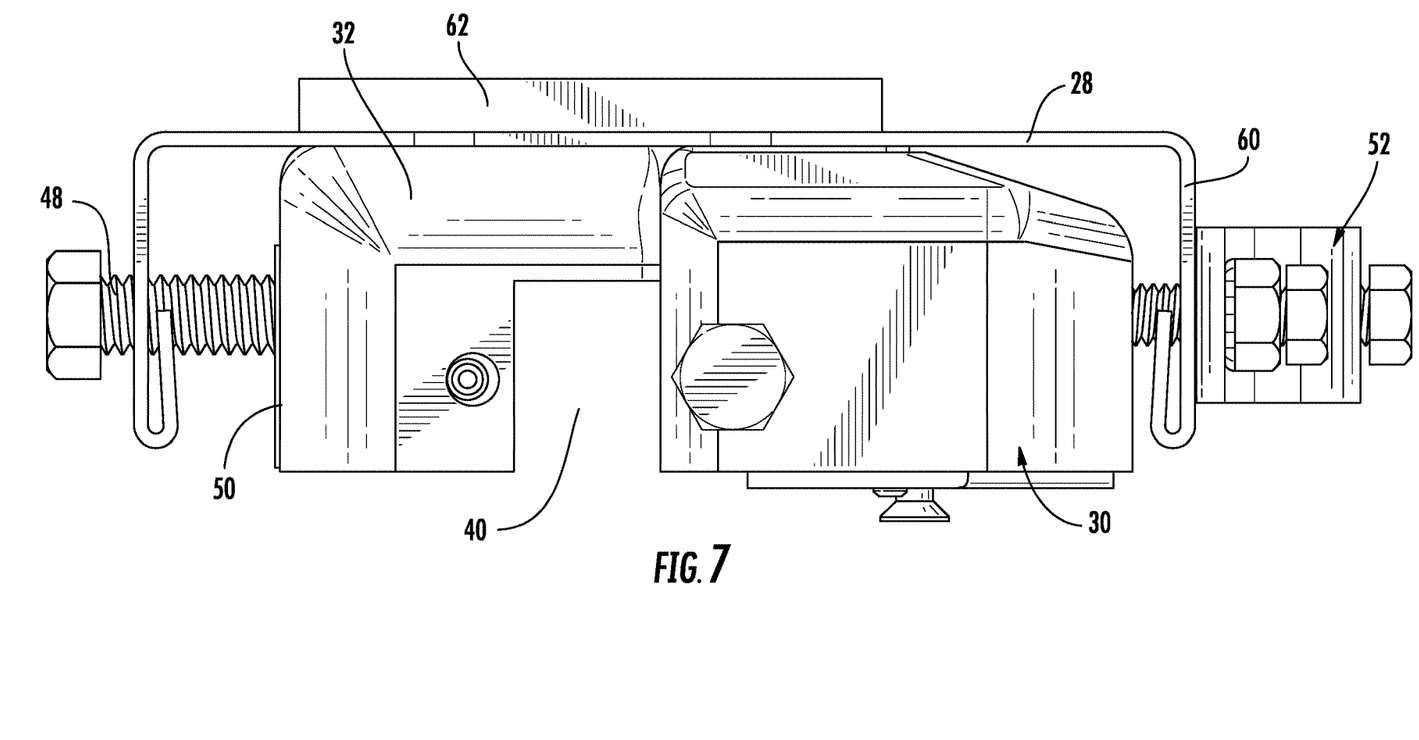
FIG. 7 is a top view of the support member connected to the braking device according to an embodiment.

The support member 62 is connected to the braking device 30 via one or more fasteners (not shown) received within one or more holes 86, 88 formed in the body of the braking device 30 and the support member, respectively. Although four holes 86 are shown in the illustrated, non-limiting embodiment of the support member 62, any number of fasteners may be used to couple the support member 62 and the braking device 30 to the car upright 28. The connection between the braking device 30 and the support member 62 restricts movement of the support member 62 out of engagement with the car upright 28. For example, engagement between the braking device 30 and the support member restricts movement of the support member 62 in a first direction away from the plane of the car upright 28. By making one or more dimensions of the back portion 66 of the support member 62 larger than a corresponding dimension of the opening 74 formed in the car upright 28, the back portion 66 overlaps the surface 29 of the car upright 28 adjacent the opening 74. This engagement restricts movement of the support member 62 relative to the car upright 28 in a second, opposite direction.

When the braking device 30 is actuated, the mechanical linkage 26 coupled to the brake wedge 36 applies a force to the brake wedge 36. As the brake wedge 36 slides within the sloped slide path 34, into engagement with the guide rail 14, the body 32 of the braking device 30 shifts laterally as the passage 40 between the brake wedge 36 and the stationary block 38 is reduced. Because the body 32 of the braking device 30 is affixed to the support member 62, the lateral movement of the braking device 30 causes the support member 62 to similarly translate within the opening 74 formed in the upright 28. By connecting the braking device 30 to a movable support member 62 rather than directly to the car upright 28, the braking device 30 is able to "float" or move independently from the elevator car 12. Accordingly, the lateral movement generated by operation of the braking device 30 is not transmitted to the elevator car 12. Further the braking load is carried by the engagement of at least one inclined surface 70, 72 of the support member 62 and an adjacent inclined surface 78, 80 of the opening 74 formed in the car upright 28.

To reset the braking device 30, i.e. move the brake wedge 36 out of engagement with the guide rail 14, the elevator car 12 may be driven upwards. As the elevator car 12 moves vertically upwards, the biasing force of the return assembly 52 will cause the braking device 30, and therefore the support member 62, to slide within the opening 74, relative to the car upright 28. Similarly, the weight of the brake wedge 36 will cause the brake wedge 36 to translate within the slope slide path 34 back to its original unactuated position.

By incorporating a "floating" braking device 30 into the elevator system 10, compression of the roller guide coupled to the elevator car 12 may be avoided during operation of the braking device 30. As a result, the roller guide design may be selected independent from braking device performance requirements. In addition, the total number of parts and therefore complexity may be reduced compared to existing braking device products.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator braking assembly comprising:
   a braking device comprising a housing, a stationary block mounted within the housing, and a brake wedge movably mounted within the housing; and
   a support member connected to the housing, the support member having a first portion and a second portion, the first portion including a first inclined body surface and a second inclined body surface, the first portion of the body being receivable within an opening having a first inclined opening surface and second inclined opening surface, the second portion of the body being remote from the opening, wherein the first inclined body surface is complementary to the first inclined opening surface and the first portion of the body is movable within the opening.

2. The support member of claim 1, wherein the first portion is a parallelogram.

3. The support member of claim 1, wherein the second inclined body surface is parallel to the first inclined body surface.

4. The support member of claim 1, wherein the body further comprises a second portion, the first portion and the second portion being integrally formed.

5. The support member of claim 4, wherein a configuration of first portion is different than a configuration of the second portion.

6. The support member of claim 4, wherein the second portion has a quadrilateral shape.

7. The support member of claim 4, wherein at least one dimension of the second portion is greater than a corresponding dimension of the opening.

8. An elevator system comprising:
   an elevator car movable vertically within a hoistway;
   a braking device; and
   a support member affixed to the housing of the braking device for associating the braking device with the elevator car, wherein in response to operation of the braking device, the support member and the braking device are movable relative to the elevator car within a plane oriented perpendicular to movement of the elevator car.

9. The elevator system of claim 8, wherein the elevator car includes a car upright having an opening formed therein and the support member further comprises a first portion received within the opening.

10. The elevator system of claim 9, wherein the first portion of the support member includes a first inclined body surface and a second inclined body surface and the opening includes a first inclined opening surface and a second inclined opening surface, the first inclined body surface being complementary to the first inclined opening surface, and the second inclined body surface being complementary to the second inclined opening surface.

11. The elevator system of claim 9, wherein the opening is larger than the first portion of the support member such that the support member is movable within the opening.

12. The elevator system of claim 9, wherein the support member further comprises a second portion, wherein a configuration of the second portion is different than a configuration of the first portion.

13. The elevator system of claim 12, wherein the first portion and the second portion are integrally formed.

14. The elevator system of claim 12, wherein the first portion is a parallelogram.

15. The elevator system of claim 12, wherein the second portion is rectangular in shape.

16. The elevator system of claim 12, wherein at least one dimension of the second portion is larger than a corresponding dimension of the opening.

* * * * *